Dec. 31, 1935.                M. CORNELL                    2,025,849
                              FLUID METER
                          Filed July 3, 1933          6 Sheets-Sheet 1

Mead Cornell,
Inventor,
Delos F. Haynes,
Attorney.

Dec. 31, 1935.    M. CORNELL    2,025,849
FLUID METER
Filed July 3, 1933    6 Sheets-Sheet 2

Mead Cornell,
Inventor,
Delos F. Haynes
Attorney.

Dec. 31, 1935.  M. CORNELL  2,025,849
FLUID METER
Filed July 3, 1933  6 Sheets-Sheet 3

Mead Cornell,
Inventor,
Delos T. Haynes,
Attorney

Dec. 31, 1935.    M. CORNELL    2,025,849
FLUID METER
Filed July 3, 1933    6 Sheets-Sheet 4

Mead Cornell,
Inventor,
Delos G. Haynes,
Attorney.

Dec. 31, 1935.　　　　　M. CORNELL　　　　　2,025,849
FLUID METER
Filed July 3, 1933　　　　6 Sheets-Sheet 5

Mead Cornell,
Inventor,
Delon F. Haynes,
Attorney.

Dec. 31, 1935.  M. CORNELL  2,025,849
FLUID METER
Filed July 3, 1933  6 Sheets-Sheet 6

Mead Cornell,
Inventor,
Delos G. Haynes
Attorney.

Patented Dec. 31, 1935

2,025,849

UNITED STATES PATENT OFFICE 2,025,849

FLUID METER

Mead Cornell, St. Louis, Mo., assignor to Lincoln Engineering Company, St. Louis, Mo., a corporation of Missouri Application July 3, 1933, Serial No. 678,828

5 Claims. (Cl. 73—37)

This invention relates to meters, and with regard to certain more specific features, to meters for measuring fluid flow of the positive displacement type.

Among the several objects of the invention may be noted the provision of a fluid flow meter which has a minimum number of moving parts which are subject to wear, and which is therefore reliable in operation over long periods of time without replacements or repair; a meter of the class described which is particularly adapted to the handling of liquids of high viscosity, such as lubricating greases, and which is constructed to shear off cleanly and accurately a series of measured quantities in metering, as contrasted with meters whose ports are not of shearing type and thereby introduce variations in accuracy; a meter of the class described comprising a pair of cooperating cylinders and a piston so arranged to function alternately as driving and measuring means, the meter being so arranged that that portion of the piston when acting as a driving piston has a greater turning moment than that portion of the piston then acting as measuring means; and the provision of a meter of the class described which is simple in construction and operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention.

Similar reference characters indicate corresponding parts throughout the several views of the drawings.

Figure 1:
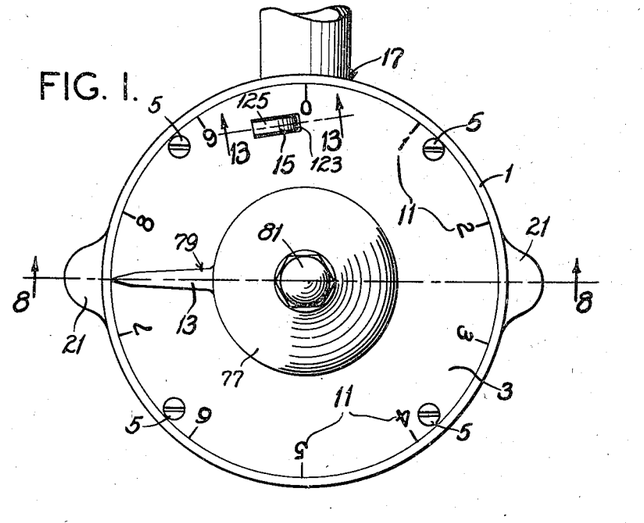
Fig. 1 is a top plan view of a meter embodying the invention.
Figure 2:
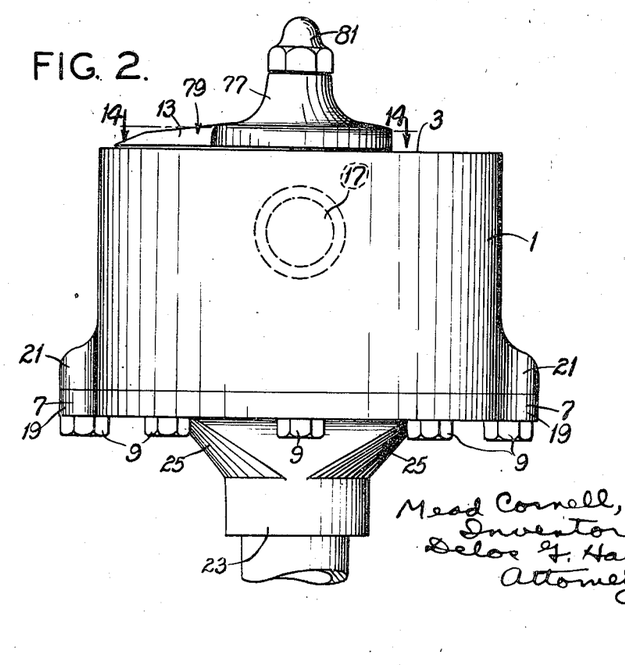
Fig. 2 is a side elevation of the meter of Fig. 1.

Referring now more particularly to Figures 1 and 2, numeral 1 indicates a cylindrical casing, which may be cast from brass or the like, and which houses the meter of the present invention. The casing 1 has a top cover portion 3 secured thereto by screws 5, and a bottom cover portion 7 secured by studs 9. The top cover 3 carries indicia 11 suitable to indicate the volume of fluid being metered, when cooperating with a rotatable handle or pointer 13. A detent stop 15 extends through the cover 3 to limit the motion of the pointer 13. The construction of the pointer 13 and detent 15 will be elaborated hereinafter.

On the side of the casing 1, near the top thereof, is provided a threaded pipe-receiving hole 17, which constitutes the meter outlet.

Figure 3:
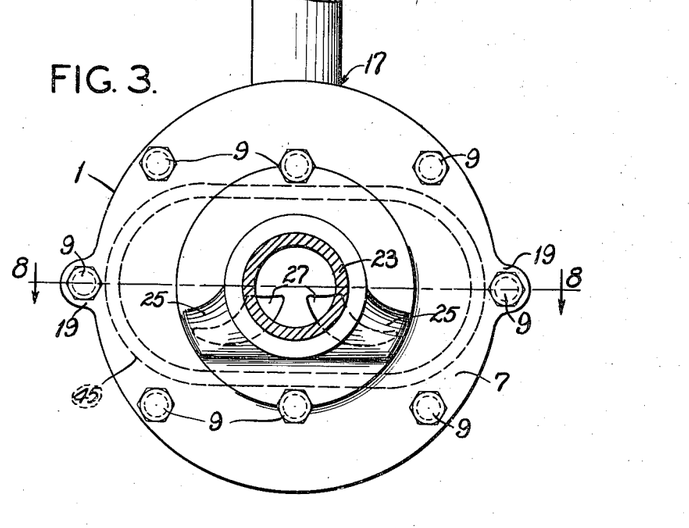
Fig. 3 is a bottom plan view of the meter of Fig. 1.

The bottom cover plate 7 (see also Fig. 3) is of generally circular shape, except for diametrically opposite extending ears 19, which receive two of the studs 9. The casing 1 (see Fig. 2) is provided with ears 21 corresponding in position to the ears 19. From the center of the bottom cover 7 leads a pipe-receiving inlet 23, which inlet 23 spreads as it joins the cover proper into a nozzle-shaped portion 25. The portion 25 communicates with two crescent-shaped ports 27 leading through the cover 7.

Figure 8:
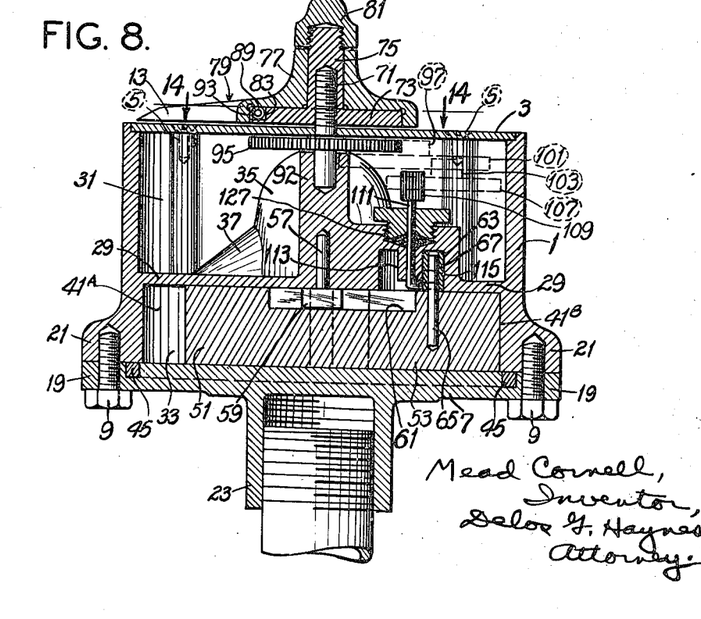
Fig. 8 is a vertical cross-section taken on line 8—8 of Figures 1 and 3.

The casing 1 is provided with a partition 29 (see Fig. 8) extending thereacross, the partition 29 dividing the casing 1 into an upper chamber 31 and a lower chamber 33. The outlet 17 communicates with a passage 35 in the upper chamber 31, which passage 35 expands into a nozzle-shaped portion 37 as it intersects the partition 29. From the portion 37 two crescent-shaped ports 39 lead into the lower chamber 33. The ports 39 are disposed on the opposite side of the chamber 33 from the ports 27 in the bottom cover 7, when the meter is in assembled condition.

The lower chamber 33 is not cylindrical, as is the upper chamber 31. Rather, it comprises a pair of circular recesses or cylinders 41A and 41B, which are substantially, although not quite, tangential, and which are connected by a passage 43. The general configuration of the recesses 41A and 41B and the passage 43 is that of the imprint of a flat-faced dumbbell. The edges of the recesses 41A and 41B and the bottom surface of said recesses are preferably machined or otherwise shaped accurately. The aforementioned ports 39 are disposed symmetrically, one in each of the recesses 41A and 41B.

Figure 6:
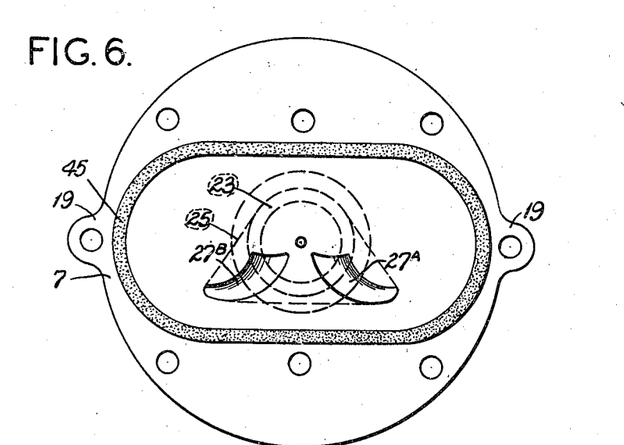
Fig. 6 is a plan view of the inside of the bottom plate removed from Fig. 5.

The bottom cover plate 7, as will be seen in Fig. 6, is provided with an accurately machined inner face, in which is embedded an oil-saturated cork gasket 45 of elongated oval shape. The gasket 45 is positioned and shaped so that when the cover plate 7 is applied, it surrounds the pair of recesses 41A and 41B completely (see Fig. 8) and prevents leakage therefrom. The ports 27 are likewise so disposed as to be arranged symmetrically, one to each of the recesses 41A and 41B, when the cover plate 7 is secured in position on the casing.

Figure 7:
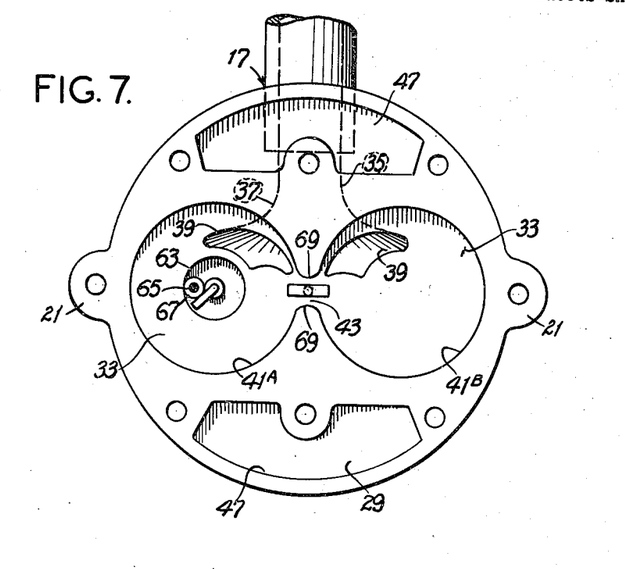
Fig. 7 is a view similar to Fig. 5, but with certain additional elements removed.

Additional recesses 47 in the walls of the casing 1 (see Figures 5 and 7) are provided to reduce the weight of the assembled meter, the recesses 47 otherwise serving no useful function.

Fitting within the recesses 41A and 41B and passage 43 is a piston 49 which has the general conformation of a dumbbell, comprising a circular head or lobe 51, a somewhat cardioid-shaped head or lobe 53, and a connecting bar 55. The piston 49 has flat upper and lower surfaces, and is just thick enough that it will slide in the recesses 41A and 41B against the tops thereof, and the flat inner surface of cover 7, without binding. In assembly (see Fig. 5), the piston 49 is positioned so that the head 51 is in the left-hand recess 41A while the head 53 is in the right-hand recess 41B, while the connecting bar 55 slides in the passage 43. The heads 51 and 53 are just large enough so that they are capable of covering both inlet and outlet ports 39 and 27, respectively, at the same time; the head 51 is indicated in such a position in Fig. 5.

Movement of the piston 49 in the recesses 41A and 41B is conditioned in two manners. First, there is provided in the center of passage 43 a rotatable pin 57 (see Fig. 8) having, for example, a rectangular head 59. The head 59 fits within a slot 61 in the upper side of the connecting bar 55. This arrangement permits the piston 49 to slide freely within the recesses 41A and 41B, but limits its rotation to that around the pin 57 as a center. The other movement-limiting means includes an annular channel 63 (see also Fig. 7) provided in the center of the recess 41A, and a pin 65 mounted centrally in the circular head 51. A collar 67 fits on the pin 65 and is in diameter enough less than the width of the channel 63 to permit of its free movement therein. This arrangement confines movement of the piston 49 within the recesses to such an extent that the center of head 51 is always constrained to move in a circle about the center of the recess 41A, the sliding of the head 59 in the slot 61 freely permitting such movement. The head 59 represents the middle point of a straight line connecting the centers of the chambers, while the slot 61 represents a straight line connecting the centers of the piston lobes. Thus, another criterion of movement of the meter is that a straight line connecting the centers of the piston lobes intersects, at all times, the middle point of a straight line connecting the centers of the chambers. The movement of each individual head is thus heliocentric, while the movement of the dumbbell 49 as a whole is both reciprocatory and oscillatory.

With the movement thus limited in two manners, the edge of the head 51 will be found always to be in substantial tangential relation to the walls of the recess 41A, because of the heliocentric motion limiting means, while the edge of the cardioid head 53 is likewise always in substantial tangential arrangement with the walls of recess 41B, because of the resultant motion transmitted from the heliocentric rotation of head 51 through the reciprocatory and oscillatory motion limiting means. The geometry of the situation, for such movement, requires that either the head 53 or the recess 41B be slightly cardioid-shaped, otherwise the desired movement will be prohibited. As it is generally easier to outwardly shape a body to a cardioid-shape than to inwardly drill it to such a shape, it is preferred to make the head 53 the cardioid and the recess 41B circular, although the reverse, with the recess 41B cardioid-shaped and the head 53 circular, is equally operable.

While the shape of the head 53 is herein referred to as that of a cardioid, this term is not to be construed strictly, as it is possible that the shape is not that of a true mathematical cardioid. Rather, the term "cardioid" as used herein is intended to cover the shape of the head required by the particular movements and shapes of the other elements in order to make operation of the device possible.

The walls of the passage 43 (see Figures 5 and 7) are rounded or pointed as at numeral 69 to permit free rotation of the connecting bar 55 in the manner described. The clearance between the walls 69 and the bar 55 does not have to be leakproof.

Figure 4:
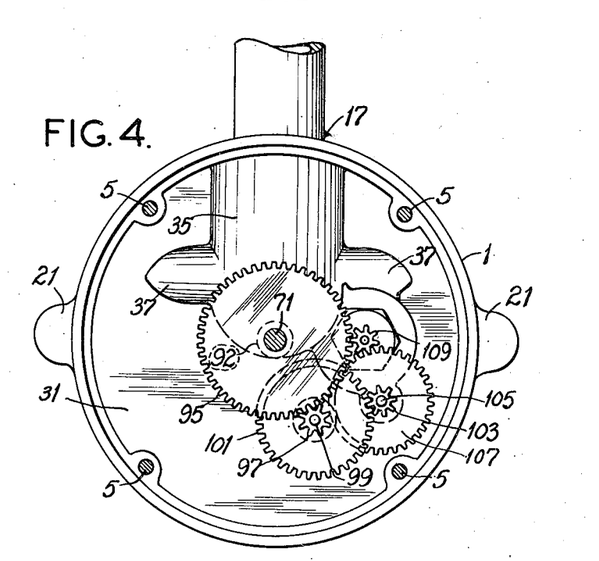
Fig. 4 is a view similar to Fig. 1, but with a certain cover plate removed.
Figure 14:
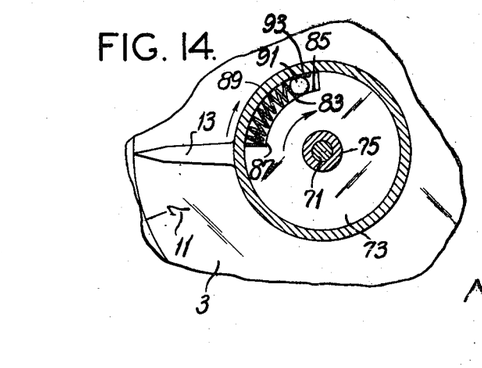
Fig. 14 is a horizontal section taken on line 14—14 of Fig. 2.

The means thus far described have to do particularly with the positive displacement or metering of the fluid. In the upper chamber 31 are provided the means for indicating the quantity of fluid metered or displaced. The means comprise a shaft 71 (Figures 4 and 8), which extends through the top cover plate 3, and to which is affixed the pointer 13. The manner of affixing the pointer 13 is indicated more particularly in Figures 8 and 14. To the shaft 71 is threaded a disc 73 having a relatively long shank 75. Rotatably fitting on the shank 75, and extending over the disc 73, is a knob 77, to which is affixed the pointer member 79 per se, the member 79 extending radially outwardly to cooperate with the index characters 11 on the plate 3. An acorn nut 81 threads on the end of shank 75 and holds the assembly together, without, however, binding or restricting the movement of knob 77. In the top face of disc 73 there is provided, at the periphery, a rectangular notch or groove 83, which tapers radially (that is, the end 85 of the groove 83 is narrower than the end 87). In the groove 83 is a compression spring 89 and a disc 91. The disc 91 normally rests against the inner surface 93 of the knob 77 and the walls of groove 83, and the spring 89 tends always to push the disc 91 in the direction of the narrower end 85. This arrangement constitutes an overriding clutch or free-wheeling device, whereby manual rotation of the knob 77 on the shaft 71 is permitted in a counterclockwise direction, but is prevented in a clockwise direction. This arrangement permits the user of the meter to set the knob 77 back to "zero" position at any time, but prevents him from arbitrarily turning the knob in a direction to increase the reading of volume of fluid delivered, thus preventing fraud in the dispensing of fluid through the device.

The inner end of shaft 71 is borne in a bearing 82 comprising an extension from the partition 29. Under the plate 3 there is affixed to the shaft 71 a gear 95 (Fig. 4) which meshes with a pinion 97. The pinion 97 is mounted on a shaft 99 which also carries a gear 101 meshing with another pinion 103 on a shaft 105. The shaft 105 carries a third gear 107 which meshes with a pinion 109 on a shaft 111. The shafts 99 and 105 are borne in bearings also comprising extensions from the partition 29. The shaft 111, however, extends entirely through the partition 29, and is located centrally in the protrusion 113 on partition 29 which forms the center of the annular groove 63. On its inner end, the shaft 111 is bent sharply at a right-angle, the right-angle portion 115 extending across the annular channel or groove 63. The protrusion 113 is cut short enough so that the portion 115 does not extend below the level of the upper surface of recess 41A.

The pin 65 mounted centrally in head 51 of the dumbbell 49, it will be remembered, moves in a circle in the channel 63. This pin 65 (or the collar 67 mounted thereon) engages the portion 115 of the shaft 111 and provides for coextensive rotation of the dumbbell 49 and the shaft 111. Inasmuch as the number of heliocentric rotations of the head 51 of piston 49 determines the volume of fluid being passed, or metered, the number of rotations of the shaft 111 is thus an index of the volume metered. The gears 95, 101, 107, and the pinions 97, 103, and 109 constitute a reduction gear train which moves the pointer 13 in conjunction with the rotation of shaft, and thus indicates the volume of fluid metered at a position visible to the user.

Figure 13:
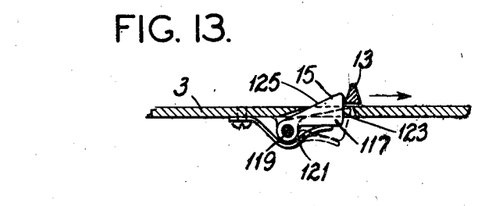
Fig. 13 is a section taken on line 13—13 of Fig. 1.

Rotation of the shaft 111 rotates the pointer 13 in a clockwise direction. If the amount metered in a given time is in excess of that represented by a full rotation of the pointer 13 on the dial 3, it is desirable that the pointer 13 be permitted to continue its rotation into a second circle without interference by the detent 15. At the same time, it is desirable that the detent 15 be always in position to stop manual counterclockwise rotation of the pointer 13 at the "zero" mark. The construction of the detent 15, as shown in Fig. 13, permits both of these desiderata. The detent 15 comprises a triangular member 117, at one end of which is a pin 119 which is carried in suitable bearings on the under side of the plate 3. The pin 119 is parallel to the plate 3. A spring 121 maintains the member 117 at all times in upwardly extended position. The conformation of the member 117 is such that a vertical face 123 is always presented to counterclockwise rotation of the pointer 13, which vertical face acts as a positive stop, but a sloping face 125 is presented to clockwise rotation of the pointer 13, which sloping face 125 permits the shank of pointer 13 to depress the detent against the spring 121 and thus to permit the pointer 13 to pass unimpededly over the detent.

A packing arrangement 127 (Fig. 8) prevents leakage of fluid around the shaft 111.

It will be understood that the means provided for volume registration (that is, the plate 3, and all of the mechanism in chamber 31) are by way of example only, and that any other suitable registration means operable by the rotation of shaft 111 can be substituted therefor within the scope of the invention.

Figure 5:
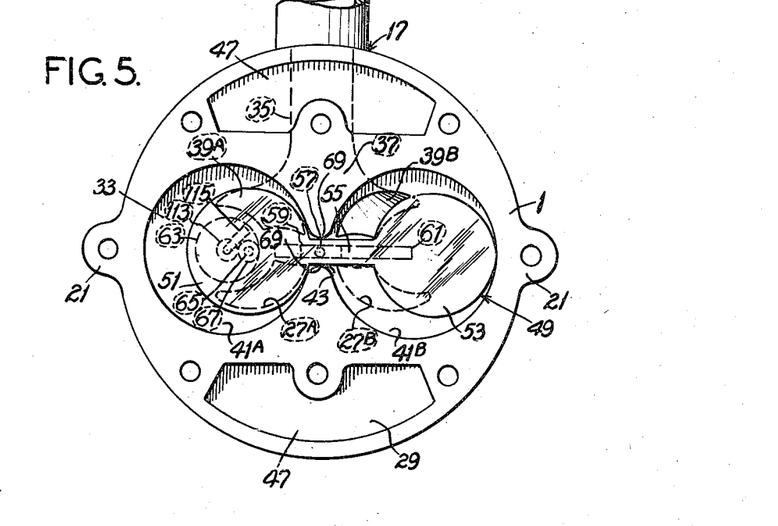
Fig. 5 is a view similar to Fig. 3, but with a certain bottom plate removed.

The operation of the metering section of the device is as follows:

Let it be assumed that the meter is completely assembled and the piston 49 is initially in the position shown in Fig. 5. The head 51 is in such position as to cover the inlet port 27A and the outlet port 39A in the recess or cylinder 41A. The longitudinal axis of the piston 49 is superimposed on the longitudinal axis of the recesses 41. The piston 49 as a whole is in effect on dead center with respect to any motion to be derived from the cylinder 41A, as both the inlet and outlet ports of said cylinder 41A are closed. However, the piston is in advantageous position to be moved by fluid coming into cylinder 41B through its inlet port 27B. The first effect of the fluid entering cylinder 41B is to rotate the piston 49 in a counterclockwise manner to the position shown in Fig. 9. This is accomplished by the fluid pressure reacting on the partition constituting the head 53 and the connecting bar 55. Inasmuch as substantially the entire bar 55 is within the cylinder 41B, the turning moment of this fluid pressure on the piston 49 is greatly in excess of any turning resistance set up, for example, by a non-moving charge of fluid in cylinder 41A.

Figure 9:
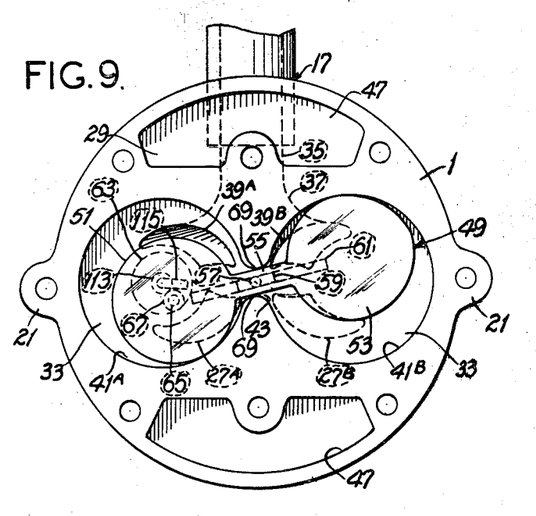
Figures 9, 10, 11, and 12 are views similar to Fig. 5, showing successive positions of a moving element.

As the Fig. 9 position is assumed, the head 51 moves to uncover both inlet port 27A and outlet port 39A in cylinder 41A. The two ports thus opened, however, communicate with separate portions of the cylinder 41A, due to the barrier effected by the head 51 and the bar 55. Incoming fluid from port 27A immediately commences to exert a turning moment on the piston 49 in aid of that supplied by the reaction of the fluid in cylinder 41B.

Figures 10, 11:
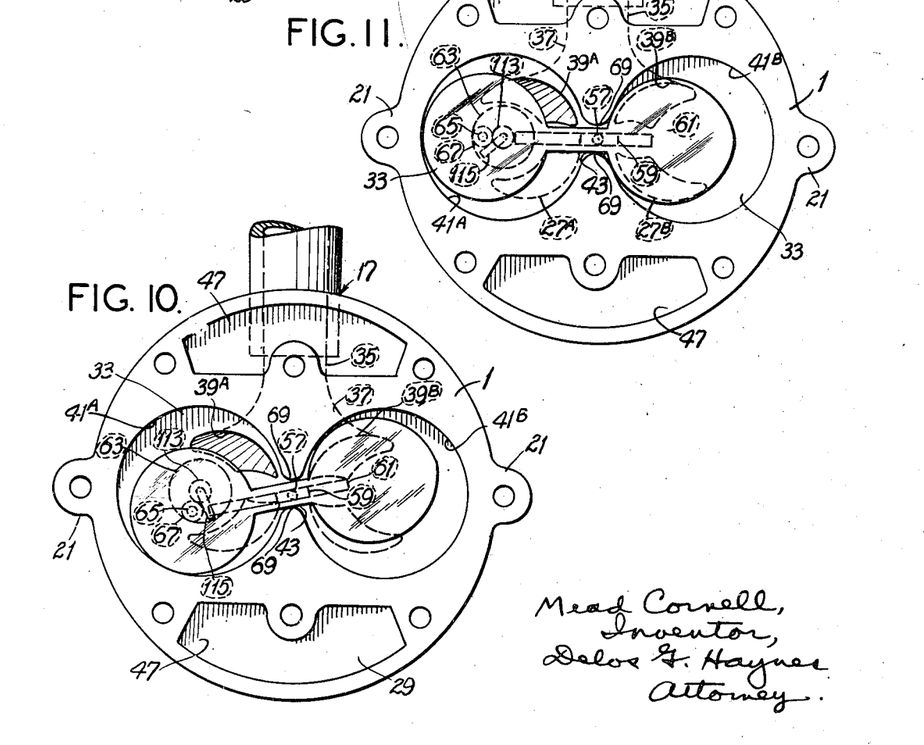

However, the moment of rotation in the cylinder 41B remains in excess of that in chamber 41A, so that further fluid, being unable further to rotate the piston in a counterclockwise manner, commences to push the piston to the left in a sliding manner, to the position illustrated by Fig 10. By the time the Fig. 10 position has been reached, the turning moment of the incoming fluid in both cylinders is about equal, but since the fluid pressure in cylinder 41A is aiding, rather than opposing the direction of movement of the piston 49, such reciprocating motion continues until the outlet port 39B of cylinder 41B is nearly closed, at which time the fluid in cylinder 41A commences to exert a clockwise rotational effect upon the piston 49. It will be understood throughout that the direction of movement of the piston 49 is regulated by the two means hereinbefore described.

During all of this time, both cylinders 41A and 41B have been filling with fluid, until now cylinder 41B is substantially completely full. The clockwise rotation of the piston 49 almost immediately moves the head 53 into position to close both ports 27B and 39B, in which position the device is substantially in the opposite dead center position to that of the Fig. 5 position. Fig. 11 shows this second dead center position.

In the Fig. 11 position, the facts are precisely opposite to those existing at the assumed start of operations. Ports 27B and 39B are completely closed, while ports 27A and 39A are both completely open. Cylinder 41B is filled with a measured volume of fluid, and since both inlet and outlet ports to that cylinder are closed, it will be seen that an accurate quantity of fluid has been "metered" out.

The reverse cycle, whereby the piston 49 moves from the Fig. 11 position back to the Fig. 5 position, takes place in almost the same manner as the forward cycle described. Fluid in cylinder 41A operates at a considerable mechanical advantage to unseat the head 53 from its dead center position. As soon as the head 53 is unseated and the inlet port 27B is uncovered, fluid commences to flow into cylinder 41B to aid in continuing the motion of the piston. However, this time the cylinder 41B is filled with a measured quantity of fluid, which is delivered through the outlet port 39B as soon as such port is uncovered. The delivery of the measured fluid is in part due to the pressure of the incoming fluid in the same chamber operating on the other side of the head 53, and partly to the pressure of the fluid in the other cylinder 41A on the head 51.

Figure 12:
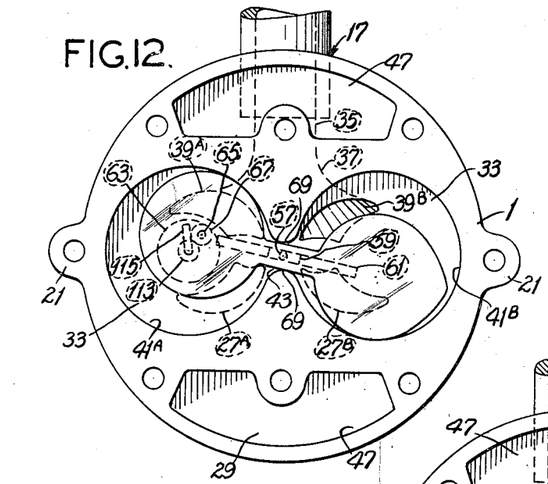

A stage intermediate between the dead center positions on the return stroke is shown in Fig. 12.

Finally, when the Fig. 5 position is again achieved, the cylinder 41A is completely filled with fluid, and the cylinder 41B is about half-filled with incoming fluid and half-filled with fluid still to be ejected. During the motion described (from Fig. 5 back to Fig. 5) the head 51 has completed one heliocentric rotation.

On subsequent cycles, it will be seen that for each complete heliocentric rotation of the head 51, the device as a whole discharges a complete measured charge from each of the cylinders 41A and 41B. Both charges have been accurately and positively displaced, so that the rotation of the shaft 111 is an accurate measure of the volume of fluid metered. The arrangement by which each time one of the heads is in dead center position, the other head in its cylinder is operating as a driving means to unseat the dead center head to initiate its further movement to exhaust its own cylinder, is particularly advantageous. The fact that the head thus operating momentarily as a driving means is positioned so as to have an increased turning moment in the desired direction makes the device substantially non-stalling, and at the same time greatly reduces the energy consumption from the fluid in passing through the meter.

Thus it will be seen that the present invention may be characterized broadly as a meter provided with a pair of circular cylinders in the same plane, and a piston comprising two joined heads each of which moves substantially heliocentrically within one of the cylinders, and inlet and outlet ports for each of the cylinders, the ports being so arranged that one of the heads is acting as a driving means to move the other head off a dead center position and initiate the exhaustion of a measured quantity of fluid from the other cylinder, and at the same time the cylinder of the driving piston is itself being filled with a measured charge of fluid.

By reason of the disposition of the dumbbell-shaped piston member, the alternately developed mechanical advantage had by the head as it becomes the driving member is so great that the movement of the other head while in dead center or median position with its ports both closed, is easily accomplished. The power consumed by the moving piston is so well utilized, and its turning moments so disposed, that the meter operates on extremely low pressures and is adaptable to use on fluids of very low viscosity and head.

The meter as described is, however, particularly adaptable to the measuring of quantities of heavy viscous liquids such as lubricating grease. This is because the valve cut-offs comprising the inlet and outlet ports act in a shearing manner, which is more advantageous to achieve accurate measurement of such liquids than the more usual type of valve.

When the meter is designed for grease measurement, it is desirable that a slight clearance be provided for between the piston and the cylinders. This is because there is a considerable power consumption occasioned by scraping a metal surface entirely clean of grease, while if a film of grease of calculated dimensions is allowed to remain on the cylinder walls at all times, the power consumption is decreased and just as effective a measurement is secured; the unit measure then being diminished by the volume of grease considered as a permanent layer on the cylinder walls. With less viscous liquids, however, this clearance may sometimes have to be reduced in the interest of accuracy.

The limit speed of the meter is practically determined by the friction on the liquid moving through the meter, and not by the friction of the meter parts on themselves. The device is absolutely automatic in operation, and, so far as the metering device proper is concerned, there is but one part in action, no separate valve controls, etc., being necessary.

It will be seen that, with the tandem inlets and outlets for the two cylinders, there is substantially no tendency for one to leak into the other. Such inner leakage, at any rate, could take place only along the connecting bar 55, were there a difference of pressure in the two chambers, which pressure difference cannot occur because the two chambers are connected together directly outside, both on the inlet and outlet sides.

To reduce the weight of the device, the heads 51 and 53 may be suitably hollowed out, except where their faces cover the ports. Such hollowing out has the beneficial effect of reducing the energy consumed by decreasing the inertia of the moving member.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A meter comprising a casing having a pair of cylindrical chambers positioned side by side, and a passage connecting said chambers, a piston comprising a two-lobed member, one lobe being positioned in each of said chambers, each lobe having a smooth peripheral contour throughout, and a connecting bar between said lobes and positioned in said passage, at least one of the two chambers or its cooperating lobe having a substantially cardioid shape, while the other chamber and lobe have circular shapes, said chambers each having inlet and outlet ports, and means constraining the piston lobes to move in predetermined paths within said chambers, maintaining at all times a sealing relationship with respect to the walls of said chambers, the inlet and outlet ports of each chamber being so disposed in that chamber that the lobe in said chamber at all times maintains said ports out of communication with each other.

2. A meter comprising a casing having a pair of cylindrical chambers positioned side by side, and a passage connecting said chambers, said chambers each having upper and lower heads comprising substantially plane, parallel surfaces, a piston comprising a two-lobed member, one lobe being positioned in each of said chambers, each lobe having a smooth peripheral contour throughout, and a connecting bar between said lobes and positioned in said passage, at least one of the two chambers or its cooperating lobe having a substantially cardioid shape, said upper and lower heads having therein inlet and outlet ports for each chamber, and means constraining the piston lobes to move in predetermined paths within said chambers and maintaining at all times a sealing relationship with respect to the walls of said chambers, said ports being so disposed on the chamber heads that, in each chamber, the lobe in said chamber at all times maintains said ports out of communication with each other.

3. A meter comprising a casing having a pair of cylindrical chambers positioned side by side, and a passage connecting said chambers, said chambers each having upper and lower heads comprising substantially plane, parallel surfaces, a piston comprising a two-lobed member, one lobe being positioned in each of said chambers, each lobe having a smooth peripheral contour throughout, and a connecting bar between said lobes and positioned in said passage, at least one of the two chambers or its cooperating lobe having a substantially cardioid shape, said upper and lower heads having therein inlet and outlet ports for each chamber, and means constraining the piston lobes to move in predetermined paths within said chambers and maintaining at all times a sealing relationship with respect to the walls of said chambers, said constraining means including means forcing the center of one of the piston lobes to rotate in a circular path about the center of the chamber containing said lobe, said ports being so disposed on the chamber heads that, in each chamber, the lobe in said chamber at all times maintains said ports out of communication with each other.

4. A meter comprising a casing having a pair of cylindrical chambers positioned side by side, and a passage connecting said chambers, said chambers each having upper and lower heads comprising substantially plane, parallel surfaces, a piston comprising a two-lobed member, one lobe being positioned in each of said chambers, each lobe having a smooth peripheral contour throughout, and a connecting bar between said lobes and positioned in said passage, at least one of the two chambers or its cooperating lobe having a substantially cardioid shape, said upper and lower heads having therein inlet and outlet ports for each chamber, and means constraining the piston lobes to move in predetermined paths within said chambers and maintaining at all times a sealing relationship with respect to the walls of said chambers, said constraining means including means forcing a straight line connecting the centers of said two piston lobes to intersect, at all times, a point at the middle of a straight line connecting the centers of the chambers, said ports being so disposed on the chamber heads that, in each chamber, the lobe in said chamber at all times maintains said ports out of communication with each other.

5. A meter comprising a casing having a pair of cylindrical chambers positioned side by side, and a passage connecting said chambers, said chambers each having upper and lower heads comprising substantially plane, parallel surfaces, a piston comprising a two-lobed member, one lobe being positioned in each of said chambers, each lobe having a smooth peripheral contour throughout, and a connecting bar between said lobes and positioned in said passage, at least one of the two chambers or its cooperating lobe having a substantially cardioid shape, said upper and lower heads having therein inlet and outlet ports for each chamber, and means constraining the piston lobes to move in predetermined paths within said chambers and maintaining at all times a sealing relationship with respect to the walls of said chambers, said constraining means including means forcing the center of one of the piston lobes to move in a circular path about the center of the chamber containing said lobe, and means constraining a straight line connecting the centers of said two lobes to intersect at all times a point at the middle of a straight line connecting the centers of the chambers, said ports being so disposed on the chamber heads that, in each chamber, the lobe in said chamber at all times maintains said ports out of communication with each other.

MEAD CORNELL.